US010738892B2

(12) United States Patent
Araki et al.

(10) Patent No.: US 10,738,892 B2
(45) Date of Patent: Aug. 11, 2020

(54) ROTARY MACHINE WITH SEAL DEVICE

(71) Applicant: MITSUBISHI HITACHI POWER SYSTEMS, LTD., Kanagawa (JP)

(72) Inventors: Masato Araki, Tokyo (JP); Yoshiyuki Okabe, Tokyo (JP); Ryosuke Mito, Tokyo (JP); Keita Takamura, Yokohama (JP); Shinya Hashimoto, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 253 days.

(21) Appl. No.: 15/542,697

(22) PCT Filed: Nov. 20, 2015

(86) PCT No.: PCT/JP2015/082660
§ 371 (c)(1),
(2) Date: Jul. 11, 2017

(87) PCT Pub. No.: WO2016/121207
PCT Pub. Date: Aug. 4, 2016

(65) Prior Publication Data
US 2017/0370476 A1    Dec. 28, 2017

(30) Foreign Application Priority Data
Jan. 27, 2015 (JP) .................. 2015-013136

(51) Int. Cl.
*F16J 15/447* (2006.01)
*F01D 11/00* (2006.01)
(Continued)

(52) U.S. Cl.
CPC ............ *F16J 15/447* (2013.01); *F01D 5/081* (2013.01); *F01D 5/085* (2013.01); *F01D 11/001* (2013.01);
(Continued)

(58) Field of Classification Search
CPC ........ F01D 11/001; F01D 11/02; F01D 11/04; F01D 5/085; H02K 5/124; F05D 2240/55; F16J 15/447; F16J 15/4472
See application file for complete search history.

(56) References Cited

U.S. PATENT DOCUMENTS 1,020,699 A * 3/1912 Kieser ................. F04D 29/2266
                                                          415/106
1,482,031 A * 1/1924 Parsons .................. F01D 11/02
                                                          277/420
(Continued)

FOREIGN PATENT DOCUMENTS

CN    103291379    9/2013
CN    103775138    5/2014
(Continued)

OTHER PUBLICATIONS

English translation of WO2014010052A1 (Year: 2014).*
(Continued)

*Primary Examiner* — Eldon T Brockman
*Assistant Examiner* — Wesley Le Fisher
(74) *Attorney, Agent, or Firm* — Wenderoth, Lind & Ponack, L.L.P.

(57) ABSTRACT

A rotary machine includes a seal device capable of restricting a flow of a fluid in a clearance between a stationary member and a rotational member. The seal device includes a pressure loss element mounted to the stationary member, a first non-contact type seal protruding from the rotational member toward the pressure loss element and facing the pressure loss element via a first gap, and a second non-contact type seal protruding from the stationary member toward the rotational member, facing the rotational member via a second gap, and being positioned on one side of the pressure loss element in a flow direction of the fluid. The seal device also includes a contact type seal protruding from
(Continued)

the stationary member toward the rotational member and being disposed downstream of the pressure loss element and the second non-contact type seal in the flow direction of the fluid.

14 Claims, 12 Drawing Sheets

(51) Int. Cl.
  F01D 11/02    (2006.01)
  F16J 15/16    (2006.01)
  F16J 15/22    (2006.01)
  F02C 7/28     (2006.01)
  F16J 15/3292  (2016.01)
  F01D 5/08     (2006.01)
  F16J 15/44    (2006.01)
  F01D 11/04    (2006.01)
  H02K 5/124    (2006.01)
  F01D 5/18     (2006.01)

(52) U.S. Cl.
  CPC .............. *F01D 11/02* (2013.01); *F01D 11/04* (2013.01); *F16J 15/3292* (2013.01); *F16J 15/444* (2013.01); *F16J 15/4472* (2013.01); *F01D 5/187* (2013.01); *F05D 2220/32* (2013.01); *F05D 2240/55* (2013.01); *F05D 2240/56* (2013.01); *H02K 5/124* (2013.01)

(56) References Cited

U.S. PATENT DOCUMENTS

| | | | | |
|---|---|---|---|---|
| 3,739,444 | A * | 6/1973 | Vargo | B23P 11/00 277/419 |
| 4,161,318 | A * | 7/1979 | Stuart | B23P 6/002 277/431 |
| 4,370,094 | A * | 1/1983 | Ambrosch | F01D 11/08 415/119 |
| 5,639,095 | A * | 6/1997 | Rhode | F16J 15/4472 277/303 |
| 8,133,014 | B1 * | 3/2012 | Ebert | F01D 11/025 415/173.3 |
| 9,476,315 | B2 | 10/2016 | Shibata et al. | |
| 2003/0223856 | A1 | 12/2003 | Yuri et al. | |
| 2004/0046326 | A1 * | 3/2004 | Yuri | F01D 5/082 277/412 |
| 2004/0247430 | A1 | 12/2004 | Brisson et al. | |
| 2008/0044284 | A1 | 2/2008 | Alvanos | |
| 2009/0243221 | A1 * | 10/2009 | Olmes | F01D 11/08 277/411 |
| 2010/0196139 | A1 * | 8/2010 | Beeck | F04D 25/16 415/111 |
| 2011/0085892 | A1 | 4/2011 | John et al. | |
| 2011/0250057 | A1 * | 10/2011 | Laurello | F01D 5/081 415/180 |
| 2011/0309585 | A1 * | 12/2011 | Uehara | F01D 11/02 277/352 |
| 2013/0223998 | A1 | 8/2013 | Endo et al. | |
| 2014/0020403 | A1 * | 1/2014 | Tsukuda | F01D 11/001 60/805 |
| 2014/0314579 | A1 | 10/2014 | Kuwamura et al. | |
| 2014/0345249 | A1 | 11/2014 | Fukuda et al. | |
| 2015/0184750 | A1 | 7/2015 | Kuwamura et al. | |

FOREIGN PATENT DOCUMENTS

| | | |
|---|---|---|
| DE | 10 2004 026 696 | 12/2004 |
| JP | 4088557 | 5/2008 |
| JP | 4146257 | 9/2008 |
| JP | 2011-85138 | 4/2011 |
| JP | 5134570 | 1/2013 |
| JP | 2014-66134 | 4/2014 |
| JP | 5502340 | 5/2014 |
| JP | 2014-141912 | 8/2014 |
| JP | 5567077 | 8/2014 |
| WO | WO-2014010052 A1 * | 1/2014 .............. F01D 11/02 |

OTHER PUBLICATIONS

Chinese Office Action dated Nov. 14, 2018 in corresponding Chinese Patent Application No. 201580074498.9 with English Translation.

Notification of Reason for Refusal dated Apr. 9, 2018 in corresponding Korean Application No. 10-2017-7020808, with English Translation.

International Preliminary Report on Patentability dated Aug. 10, 2017 in International (PCT) Application No. PCT/JP2015/082660 with English translation.

International Search Report dated Mar. 1, 2016 in International (PCT) Application No. PCT/JP2015/082660.

Chinese Office Action dated Feb. 24, 2018 in corresponding Chinese Patent Application No. 201580074498.9 with English Translation.

Japanese Notification of Reasons for Refusal dated Mar. 2, 2018 in corresponding Japanese Patent Application No. 2016-571789 with Machine Translation.

Office Action dated May 20, 2020, issued in counterpart German application No. 11 2015 006 063.4 with English translation.

* cited by examiner

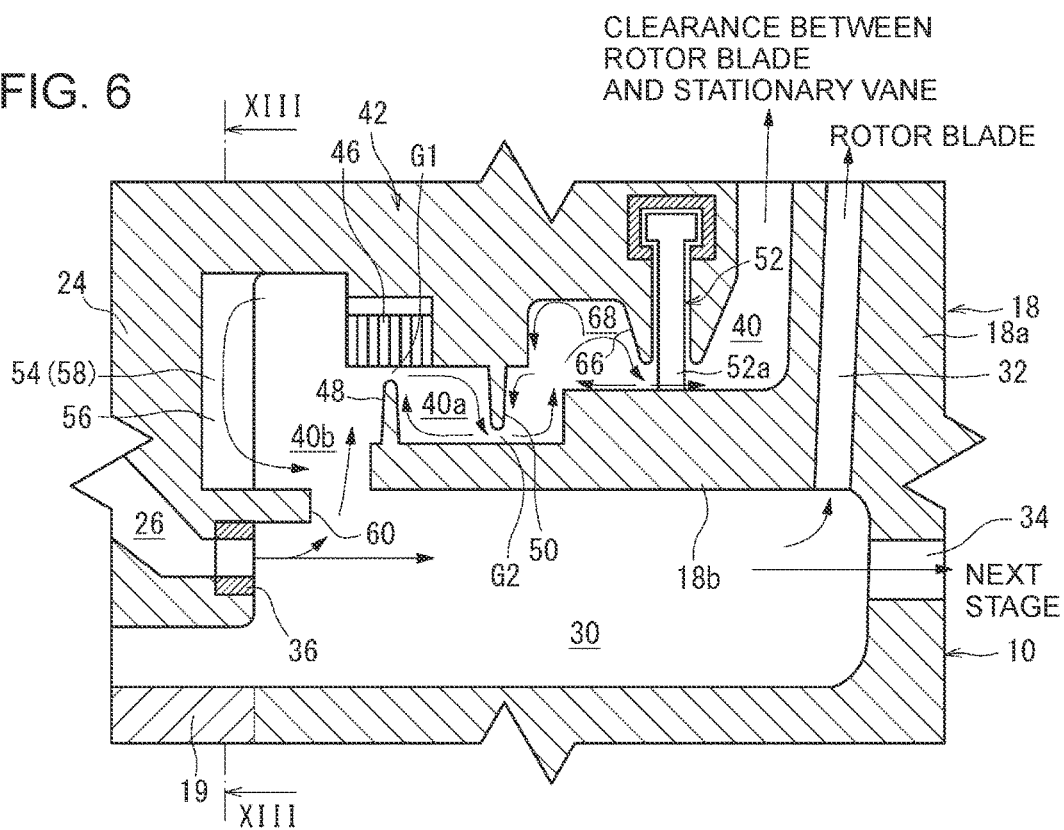
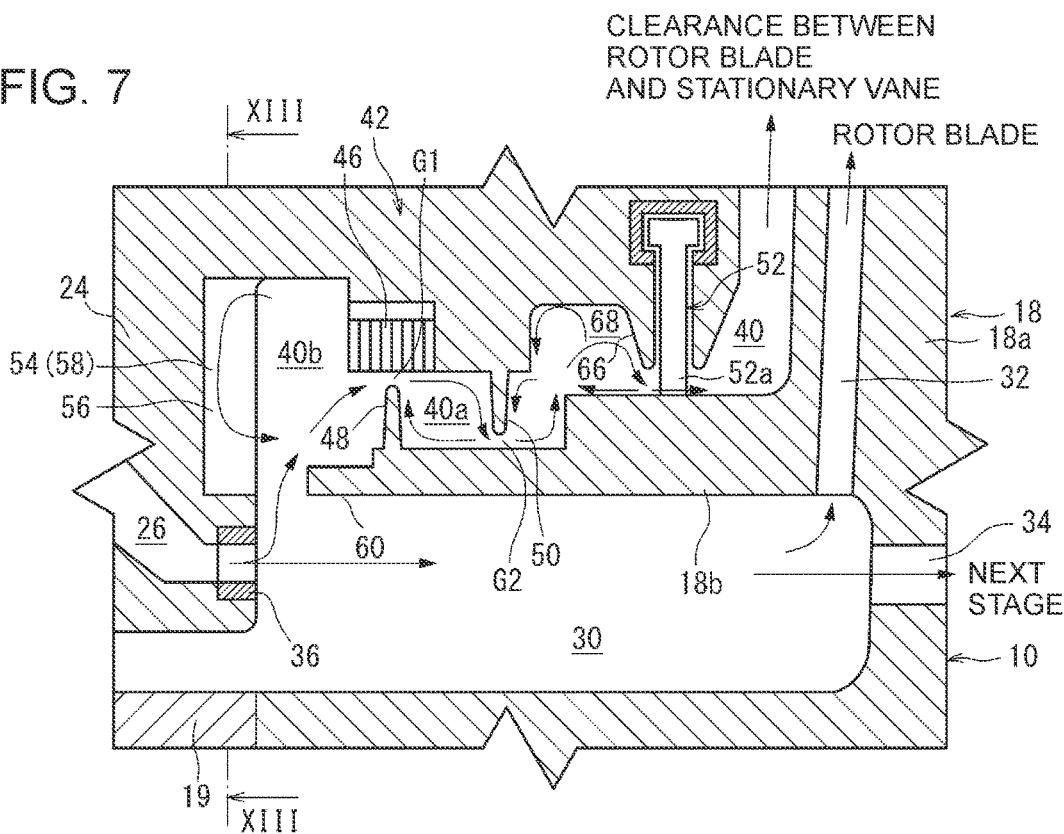

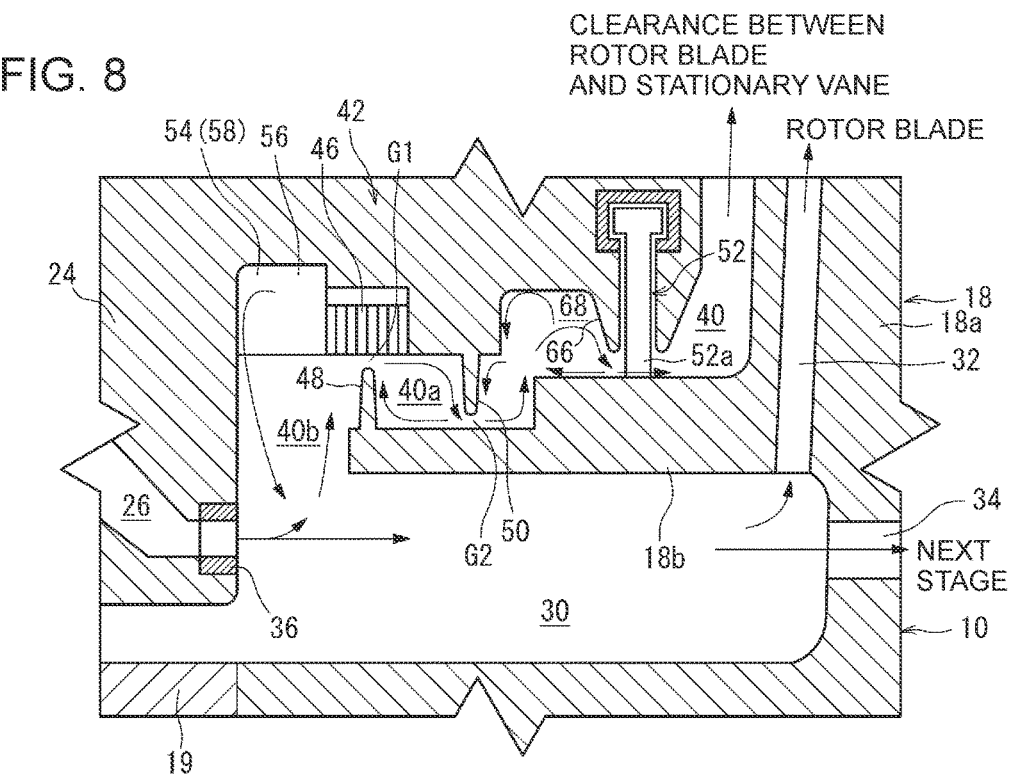
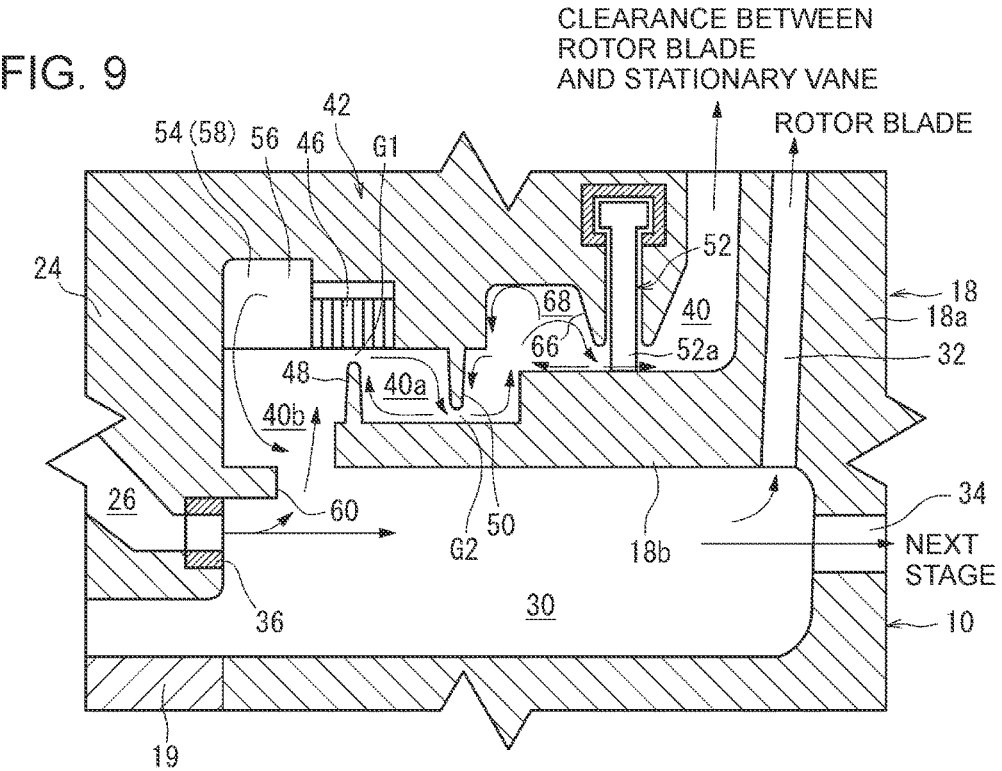

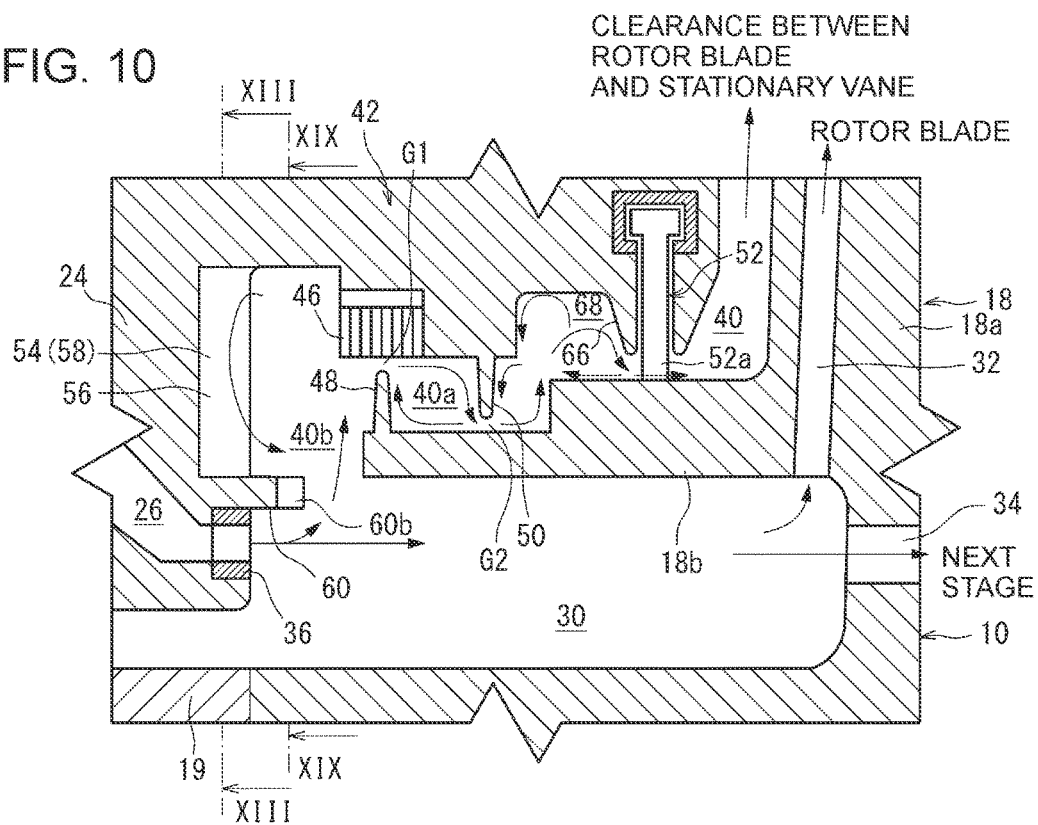
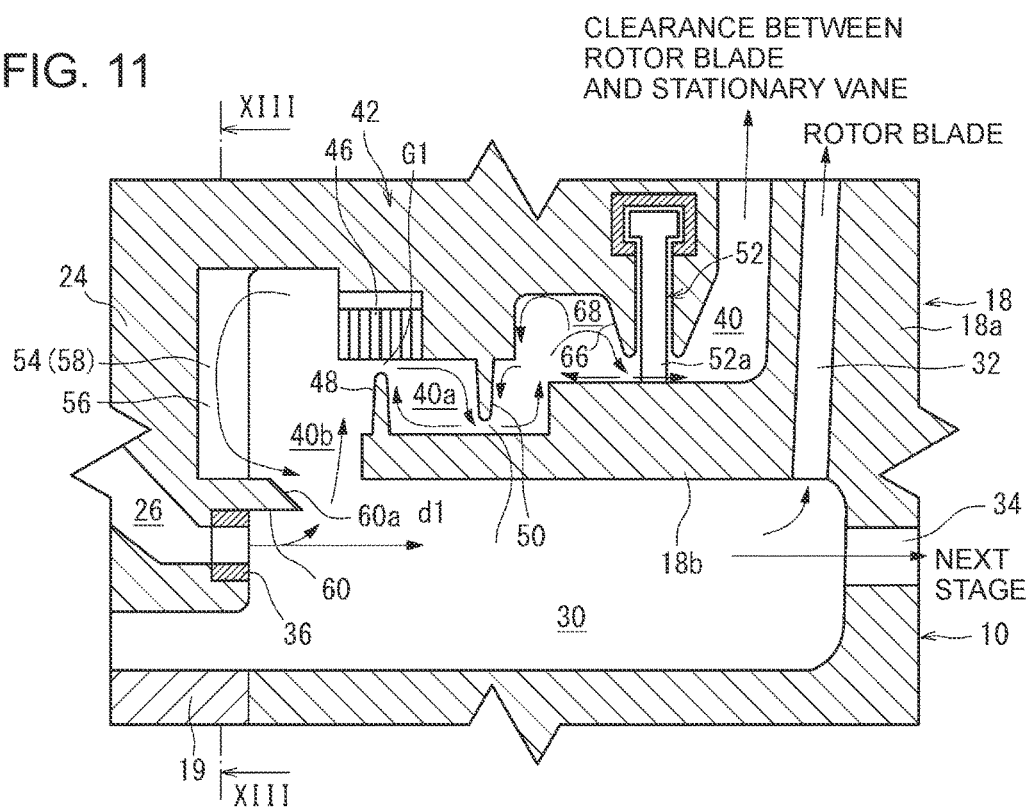

ROTARY MACHINE WITH SEAL DEVICE

TECHNICAL FIELD

The present disclosure relates to a rotary machine.

BACKGROUND ART

A rotary machine such as a gas turbine, a steam turbine, a compressor and a generator is normally provided with a seal device capable of restricting a flow of a fluid in clearance between a rotational member and a stationary member.

As such a type of seal device, JP2014-66134A for instance discloses a rotary machine provided with a seal device having a contact type seal and a swirl-flow suppressing part disposed upstream of the contact type seal. The swirl-flow suppressing part includes a honeycomb seal, for instance, and has a function to suppress collision or passage of a swirl flow at the contact type seal, thus preventing damage to the contact type seal.

SUMMARY

Problems to be Solved

In the rotary machine disclosed in JP2014-66134A, the swirl-flow suppressing part is disposed upstream of the contact type seal to ensure reliability of the contact type seal. Nevertheless, further improvement of reliability is desirable.

In view of the above issue, an object of at least one embodiment of the present invention is to provide a rotary machine equipped with a seal device that has a high reliability even if a flow of a fluid to be restricted contains a swirl component.

Solution to the Problems (1) A rotary machine according to at least one embodiment of the present invention comprises: at least one stationary member; at least one rotational member configured to be relatively rotatable with respect to the at least one stationary member; and a seal device capable of restricting a flow of a fluid in a clearance between the at least one stationary member and the at least one rotational member. The seal device comprises: a pressure loss element mounted to the at least one stationary member; a first non-contact type seal protruding from the at least one rotational member toward the pressure loss element and facing the pressure loss element via a first gap; a second non-contact type seal protruding from the at least one stationary member toward the at least one rotational member, facing the at least one rotational member via a second gap, and being positioned on one side of the pressure loss element in a flow direction of the fluid; and a contact type seal protruding from the at least one stationary member toward the at least one rotational member and being disposed downstream of the pressure loss element and the second non-contact type seal in the flow direction of the fluid.

With the above rotary machine (1), the second non-contact type seal protrudes from the stationary member, and a part of the flow circulates between the first non-contact type seal and the second non-contact type seal. Specifically, for instance, if the second non-contact type seal is disposed downstream of the first non-contact type seal, a part of the flow of fluid collides with the second non-contact type seal, and flows toward the first non-contact type seal. Accordingly, a part of a flow of fluid circulates to form a swirl, and thereby the flow of fluid makes contact with the stationary member over a longer distance, and the friction with the stationary member reduces the swirl component of the flow of fluid. As a result, the swirl component of the flow of fluid colliding with the contact type seal or passing through the contact type seal is reduced, and the reliability of the contact type seal improves.

(2) In some embodiments, in the above configuration (1), the clearance between the at least one rotational member and the at least one stationary member includes an axial-directional clearance extending along a rotational shaft of the rotational member. The first non-contact type seal and the second non-contact type seal are disposed in the axial-directional clearance. In a radial direction of the rotational shaft, a position of the first gap is different from a position of the second gap.

With the above rotary machine (2), the radial-directional position of the first gap is different from that of the second gap, and thus the flow of fluid cannot pass through the first gap and the second gap straight in the axial direction. Thus, between the first non-contact type seal and the second non-contact type seal, a greater amount of fluid can be circulated to form a swirl, and it is possible to reduce the swirl component of the flow of fluid even further.

(3) In some embodiments, in the above configuration (2), the clearance between the at least one rotational member and the at least one stationary member includes a cavity extending in the radial direction of the rotational shaft of the rotational member and being disposed upstream of the axial-directional clearance in the flow direction of the fluid. The seal device further comprises a plurality of walls disposed inside the cavity so as to be arranged in a circumferential direction of the rotational shaft, each of the plurality of walls intersecting with the circumferential direction of the rotational shaft.

With the above configuration (3), the flow of fluid creates a circulating flow to form a vortex inside the cavity. The fluid collides with the plurality of walls disposed in the cavity, and thereby the swirl component contained in the flow of fluid decreases. Accordingly, the swirl component of the flow of fluid colliding with the contact type seal or passing through the contact type seal is reduced, and the reliability of the contact type seal improves even further.

(4) In some embodiments, in the above configuration (3), the plurality of walls comprise wall surfaces of a plurality of grooves formed on a wall of the at least one stationary member defining the cavity.

With the above configuration (4), the wall surfaces of the plurality of grooves formed on the wall of the stationary member reduce the swirl component contained in the flow of fluid.

(5) In some embodiments, in the above configuration (4), the wall of the at least one stationary member defining the cavity extends in the radial direction of the rotational shaft. Each of the plurality of grooves extends so as to be parallel, oblique, or curved to gradually deviate with respect to the radial direction of the rotational shaft.

With the above configuration (5), the plurality of grooves extending so as to be parallel, oblique, or curved to gradually deviate with respect to the radial direction of the rotational shaft reduce the swirl component contained in the flow of fluid. Furthermore, the plurality of grooves that are inclined or curved can reduce the swirl component by generating an inverse swirl component in the flow of fluid.

(6) In some embodiments, in the above configuration (4), the wall of the at least one stationary member defining the cavity extends in an axial direction of the rotational shaft. Each of the plurality of grooves extends so as to be parallel, oblique, or curved to gradually deviate with respect to the axial direction of the rotational shaft.

With the above configuration (6), the plurality of grooves extending so as to be parallel, oblique, or curved to gradually deviate with respect to the axial direction of the rotational shaft reduce the swirl component contained in the flow of fluid. Furthermore, the plurality of grooves that are inclined or curved can reduce the swirl component by generating an inverse swirl component.

(7) In some embodiments, in the above configuration (3), the plurality of walls comprise wall surfaces of a plurality of baffles disposed inside the cavity.

With the above configuration (7), the plurality of baffles disposed inside the cavity reduce the swirl component contained in the flow of fluid.

(8) In some embodiments, in the above configuration (7), each of the plurality of baffles extends so as to be parallel, oblique, or curved to gradually deviate with respect to the radial direction of the rotational shaft.

With the above configuration (8), the plurality of baffles extending so as to be parallel, oblique, or curved to gradually deviate with respect to the radial direction of the rotational shaft reduce the swirl component contained in the flow of fluid. Furthermore, the plurality of baffles that are inclined or curved can reduce the swirl component by generating an inverse swirl component.

(9) In some embodiments, in the above configuration (7), each of the plurality of baffles extends so as to be parallel, oblique, or curved to gradually deviate with respect to an axial direction of the rotational shaft.

With the above configuration (9), the plurality of baffles extending so as to be parallel, oblique, or curved to gradually deviate with respect to the axial direction of the rotational shaft reduce the swirl component contained in the flow of fluid. Furthermore, the plurality of baffles that are inclined or curved can reduce the swirl component by generating an inverse swirl component.

(10) In some embodiments, in any one of the above configurations (1) to (9), the rotary machine further comprises a swirl-component imparting device capable of imparting a swirl component to the fluid. The clearance between the at least one rotational member and the at least one stationary member includes an axial-directional clearance extending along a rotational shaft of the rotational member and a cavity extending in a radial direction of the rotational shaft of the rotational member and being disposed upstream of the axial-directional clearance in the flow direction of the fluid. The cavity has an opening which opens into a main flow passage extending in an axial direction of the rotational shaft and being capable of letting the fluid having the swirl component imparted by the swirl-component imparting device flow through. One of the at least one stationary member or the at least one rotational member includes a wall extending in the radial direction of the rotational shaft and a protruding portion extending in the axial direction of the rotational shaft from the wall and defining a width of the opening, so that the width of the opening is smaller than a width of the cavity.

With the above configuration (10), it is possible to adjust the width of the opening of the cavity with the protruding portion, and to adjust the flow rate of the fluid flowing from the main flow passage to the cavity. Accordingly, it is possible to adjust the mixing state of the flow of the fluid flowing from the main flow passage into the cavity and the circulation flow inside the cavity, in the vicinity of the opening. Further, by adjusting the mixing state, it is possible to reduce the swirl component contained in the flow of the fluid.

(11) In some embodiments, in the above configuration (10), a surface of the protruding portion closer to the cavity is inclined with respect to the axial direction of the rotational shaft.

With the above configuration (11), it is possible to adjust the mixing state of the circulation flow inside the cavity and the flow of the fluid flowing into the opening from the main flow passage with the inclined surface of the protruding portion disposed closer to the cavity, and thus it is possible to reduce the swirl component contained in the flow of the fluid.

(12) In some embodiments, in the above configuration (10) or (11), a plurality of recessed portions arranged in a circumferential direction of the rotational shaft are formed on a tip side of the protruding portion, and the plurality of recessed portions change the width of the opening in the circumferential direction of the rotational shaft.

With the above configuration (12), it is possible to adjust the flow rate of the fluid flowing from the main flow passage to the cavity by changing the width of the opening with the plurality of recessed portions of the protruding portion. Accordingly, it is possible to adjust the mixing state of the circulation flow inside the cavity and the flow of the fluid flowing into the opening from the main flow passage, and thus it is possible to reduce the swirl component contained in the flow of the fluid.

(13) In some embodiments, in any one of the above configurations (1) to (12), the seal device further comprises at least one swirl-component suppressing flow passage disposed in the at least one stationary member, the at least one swirl-component suppressing flow passage being capable of supplying a fluid for reducing a swirl component of the fluid to a section upstream of the pressure loss element in the flow direction of the fluid in the clearance between the at least one stationary member and the at least one rotational member.

With the above configuration (13), it is possible to reduce the swirl component of the fluid colliding with the contact type seal or passing through the contact type seal with a fluid supplied to upstream of the pressure loss element from the swirl-component suppressing flow passage.

(14) In some embodiments, in any one of the above configurations (1) to (13), the pressure loss element is a honeycomb seal. Each of the first non-contact type seal and the second non-contact type seal is a fin seal. The contact type seal has a plurality of thin plates arranged in a circumferential direction of a rotational shaft of the rotational member.

With the above rotary machine (14), the honeycomb seal serving as the pressure loss element reduces the swirl component in the flow of fluid efficiently, and in addition, the fin seal circulates the flow of fluid to form a swirl, thereby further reducing the swirl component.

(15) A rotary machine according to at least one embodiment of the present invention comprises: at least one stationary member; at least one rotational member configured to be relatively rotatable with respect to the at least one stationary member; a seal device capable of restricting a flow of a fluid in a clearance between the at least one stationary member and the at least one rotational member; and a swirl-component imparting device disposed upstream of the seal device in a flow direction of the fluid and being capable of imparting a swirl component to the fluid. The clearance between the at least one stationary member and the at least one rotational member includes a cavity having an opening into a main flow passage being capable of letting the fluid having the swirl component imparted by the swirl-component imparting device flow through. The seal device comprises: a pressure loss element mounted to the at least one stationary member and being disposed downstream of the cavity in the flow direction of the fluid; a first non-contact type seal protruding from the at least one rotational member toward the pressure loss element and facing the pressure loss element via a first gap; a contact type seal protruding from the at least one stationary member toward the at least one rotational member and being disposed downstream of the pressure loss element and the first non-contact type seal in the flow direction of the fluid; and at least one swirl-component suppressing flow passage disposed in the at least one stationary member and being capable of supplying the cavity with a fluid for reducing the swirl component of the fluid.

With the above configuration (15), the fluid supplied to the cavity through the swirl-component suppressing flow passage prevents the fluid from flowing into the cavity from the main flow passage, or is mixed with the fluid flowing into the cavity from the main flow passage, and thereby it is possible to reduce the swirl component contained in the flow of fluid.

Advantageous Effects

According to at least one embodiment of the present invention, provided is a rotary machine equipped with a seal device that has a high reliability even if a flow of a fluid to be restricted contains a swirl component.

BRIEF DESCRIPTION OF DRAWINGS

FIG. 6 is a diagram of a turbine according to some embodiments, corresponding to FIG. 3.

FIG. 7 is a diagram of a turbine according to some embodiments, corresponding to FIG. 3.

FIG. 8 is a diagram of a turbine according to some embodiments, corresponding to FIG. 3.

FIG. 9 is a diagram of a turbine according to some embodiments, corresponding to FIG. 3.

FIG. 10 is a diagram of a turbine according to some embodiments, corresponding to FIG. 3.

FIG. 11 is a diagram of a turbine according to some embodiments, corresponding to FIG. 3.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
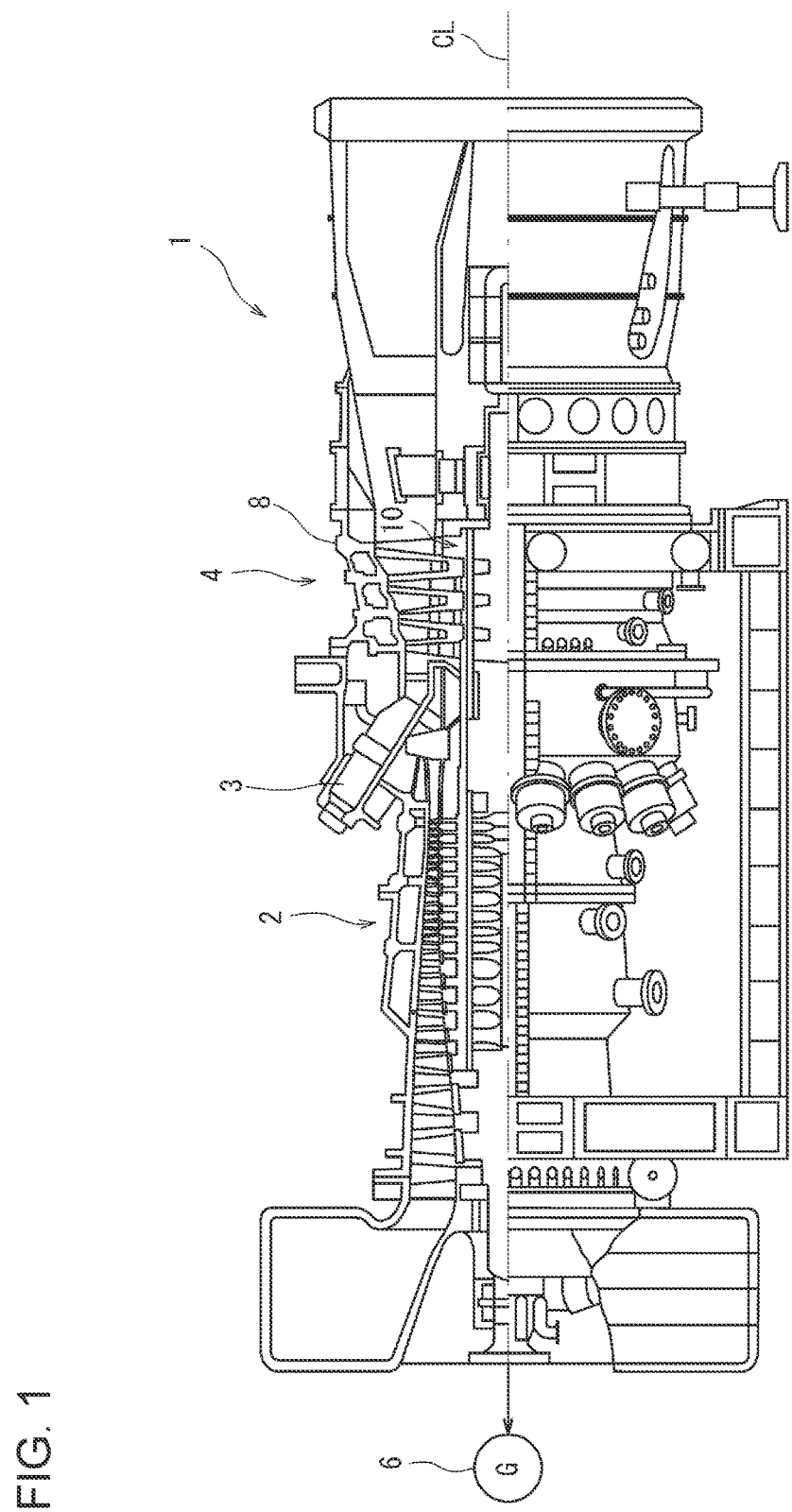
FIG. 1 is a schematic configuration diagram of a gas turbine according to an embodiment of the present invention.

FIG. 1 is a schematic configuration diagram of a gas turbine 1 according to an embodiment of the present invention. As shown in FIG. 1, the gas turbine 1 according to the present embodiment includes a compressor (compressing part) 2, a combustor (combustion part) 3, and a turbine (turbine part) 4, and drives an external device such as a generator 6.

The compressor 2 sucks in and compresses atmosphere, which is external air, and supplies the compressed air to the combustor 3.

The combustor 3 combusts fuel supplied from outside by using air compressed by the compressor 2, thereby producing high-temperature gas (combustion gas).

The specific configuration of each of the above compressor 2 and the combustor 3 may be a known configuration, without any particular limitation.

The turbine 4 generates a rotational driving force in response to supply of high-temperature gas produced by the combustor 3, and outputs the generated rotational driving force to the compressor 2 and an external device.

The turbine 4 has a rotor 10 disposed rotatably inside the casing 8, and the rotor 10 is coupled to the rotational shafts of the compressor 2 and an external device. The turbine 4 includes a plurality of stages of stationary-vane rows and rotor-blade rows arranged in the axial direction of the rotational shaft CL of the rotor 10 (hereinafter, also referred to as merely axial direction), each stationary-vane row being fixed to the casing 8 and each rotor-blade row to the rotor 10. The stationary-vane row includes a plurality of stationary vanes arranged in the circumferential direction of the rotational shaft CL of the rotor 10 (hereinafter, also referred to as the circumferential direction), while each rotor-blade row includes a plurality of rotor blades arranged in the circumferential direction.

Figure 2:
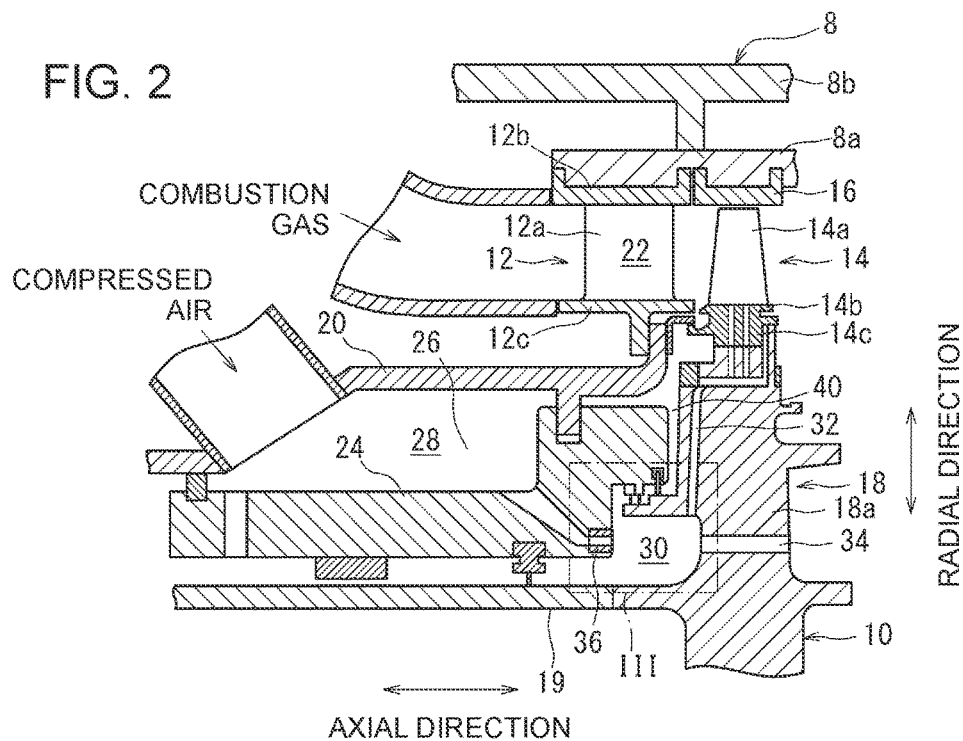
FIG. 2 is a schematic configuration diagram of a part of the turbine in FIG. 1.

FIG. 2 is a schematic configuration diagram of a part of the turbine 4. FIG. 2 shows the stationary vane 12 of the first stage and the rotor blade 14 of the first stage, from among the plurality of stationary vanes and rotor blades.

The casing 8 includes an inner casing 8a of a cylindrical shape surrounding the rotor 10 and an outer casing 8b of a cylindrical shape surrounding the inner casing 8a. The inner casing 8a is supported by the outer casing 8b. The inner casing 8a surrounds the stationary vane 12 and the rotor blade 14. A plurality of ring segments 16 are fixed to a region of the inner casing 8a that faces the rotor blade 14.

The rotor blade 14 includes a blade portion 14a, a platform 14b connecting to one end side of the blade portion 14a in the radial direction of the rotational shaft CL of the rotor 10 (hereinafter, also referred to as merely radial direction), and a blade root portion 14c connecting to the inner side, in the radial direction, of the platform 14b. The rotor 10 includes a rotor disc 18 and a cylindrical shaft 19 coupled to each other coaxially and integrally. The blade root portion 14c of the rotor blade 14 is mounted to the outer peripheral side of the rotor disc 18.

The stationary vane 12 includes a vane portion 12a, and platforms 12b, 12c connected to respective sides of the vane portion 12a in the radial direction. The outer platform 12b is fixed to the inner casing 8a, and the inner platform 12c is fixed to an outer partition-wall portion 20 of a cylindrical shape surrounding the rotor 10.

The platforms 12b, 12c of the stationary vane and the platform 14b and the ring segments 16 of the rotor blade form a combustion gas flow passage 22 of a cylindrical shape. The combustion gas flow passage 22 is supplied with high-temperature gas from the combustor 3. The blade portion 14a of the rotor blade 14 and the vane portion 12a of the stationary vane 12 are disposed in the combustion gas flow passage 22.

An inner partition-wall portion 24 of a cylindrical shape surrounding the rotor 10 is fixed the inner side, in the radial direction, of the outer partition-wall portion 20, and the inner partition-wall portion 24 is disposed between the outer partition-wall portion 20 and the rotor 10. The outer partition-wall portion 20 and the inner partition-wall portion 24 are fixed to the casing 8.

Furthermore, a compressed-air supply passage 26 is disposed in the casing 8. The compressed-air supply passage 26 extends penetrating through the inner partition-wall portion 24, extending from the first space 28 defined between the inner partition-wall portion 24 and the outer partition-wall portion 20 to the second space (rotational shaft enveloping space) 30 of an annular shape surrounding the rotor 10.

The first space 28 is supplied with compressed air extracted from the compressor 2, and the compressed air flows into the second space 30. An outer peripheral surface of the rotor 10 and a side surface of the rotor disc 18 face the second space 30.

The rotor disc 18 has a plurality of radial-directional holes 32 formed therein, each extending in the radial direction and formed at distance from one another in the circumferential direction. Each radial-directional hole 32 has an opening into the second space 30. Accordingly, the second space 30 is in communication with each radial-directional hole 32. Compressed air is supplied to the rotor blade 14 through the radial-directional holes 32, and cools the rotor blade 14. In other words, a part of compressed air is used as cooling air.

Furthermore, a plurality of axial-directional holes 34 each penetrating the rotor disc 18 in the axial direction are formed at distance from one another in the circumferential direction. Each axial-directional hole 34 has an opening into the second space 30, and the second space 30 is in communication with the axial-directional holes 34. Accordingly, through the axial-directional holes 34, compressed air is supplied to the rotor blades of the rotor-blade row of the next stage.

During operation of the gas turbine 1, the radial-directional holes 32 and the axial-directional holes 34 rotate relative to the second space 30, and thus pressure loss (inflow loss/pumping loss) is created corresponding to the speed difference in the rotational direction between compressed air and the rotor disc 18 when compressed air flows into the radial-directional holes 32 and the axial-directional holes 34 from the second space 30. To suppress such pressure loss, a velocity in the rotational direction (swirl component) is imparted to the compressed air supplied to the second space 30.

Thus, the turbine 4 is provided with a swirl-component imparting device 36. The swirl-component imparting device 36 includes, for instance, a tangential on-board injection (TOBI) nozzle. The TOBI nozzle is mounted to the inner partition-wall portion 24, and the compressed-air supply passage 26 extends through the TOBI nozzle.

Furthermore, annular clearance (rim clearance) 40 extends between the second space 30 and the combustion gas flow passage 22. The rim clearance 40 is disposed between a stationary member including the inner partition-wall portion 24 and the outer partition-wall portion 20, and a rotational member relatively rotatable to the stationary member, including the rotor disc 18. The rim clearance 40 is in communication with the combustion gas flow passage 22 via the gap between the stationary vane 12 and the rotor blade 14. Thus, a part of compressed air flows through the rim clearance 40 toward the combustion gas flow passage 22, and seals the gap between the stationary vane 12 and the rotor blade 14. In other words, a part of compressed air is used as sealing air.

The turbine 4 is provided with a seal device 42 for restricting the flow rate of air flowing through the rim clearance 40 between the stationary member and the rotational member.

Figure 3:
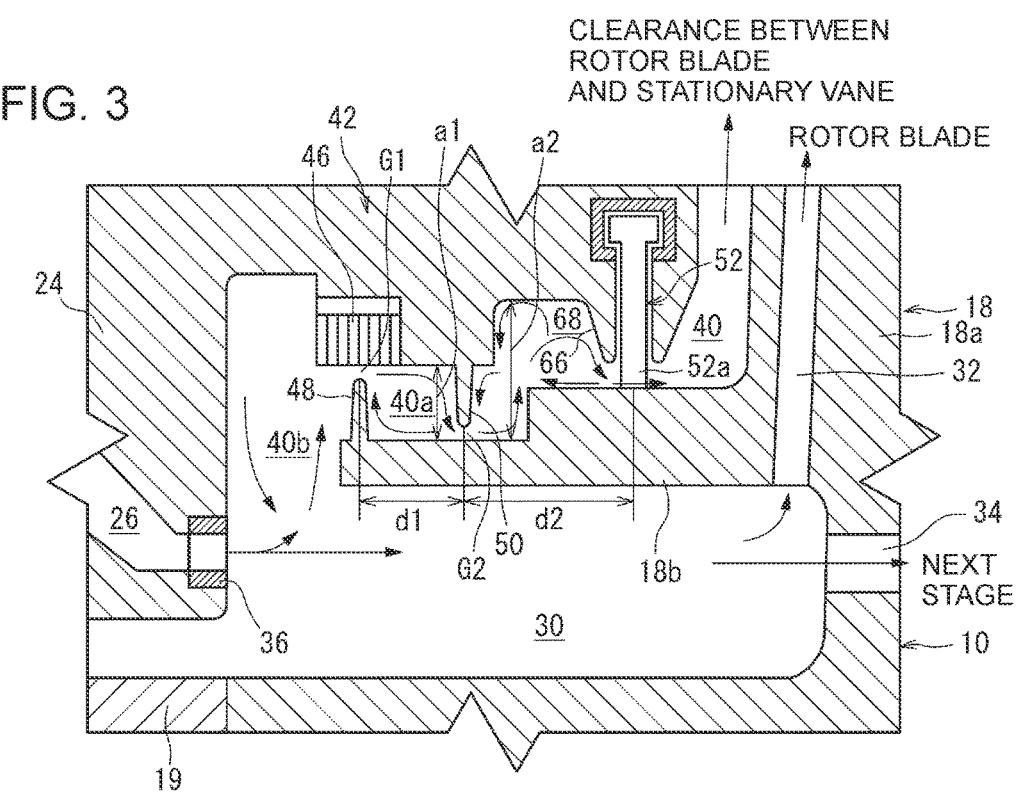
FIG. 3 is a cross-sectional view schematically showing region III in FIG. 2.

FIG. 3 is a cross-sectional view schematically showing region III in FIG. 2. FIGS. 4 to 12, 22 are each a cross-sectional view corresponding to FIG. 3, according to some embodiments. As shown in FIGS. 3 to 12, and 22, the seal device 42 includes a pressure loss element 46, a first non-contact type seal 48, a second non-contact type seal 50, and a contact type seal 52.

The pressure loss element 46 is mounted to the inner partition-wall portion 24, which is a stationary member, and faces the rim clearance 40. The pressure loss element 46 has a function to suppress a swirl component of air that flows along the pressure loss element 46.

The first non-contact type seal 48 protrudes toward the pressure loss element 46 from the rotor disc 18 being a rotational member, and faces the pressure loss element 46 via the first gap G1.

The second non-contact type seal 50 protrudes toward the rotor disc 18 from the inner partition-wall portion 24 being a stationary member, and faces the rotor disc 18 via the second gap G2. The second non-contact type seal 50 is disposed on one of the upstream side or the downstream side of the pressure loss element 46 in the flow direction of air.

The contact type seal 52 protrudes toward the rotor disc 18 being a rotational member from the inner partition-wall portion 24 being a stationary member, and is disposed downstream of the pressure loss element 46 and the second non-contact type seal 50 in the flow direction of fluid.

Figure 4:
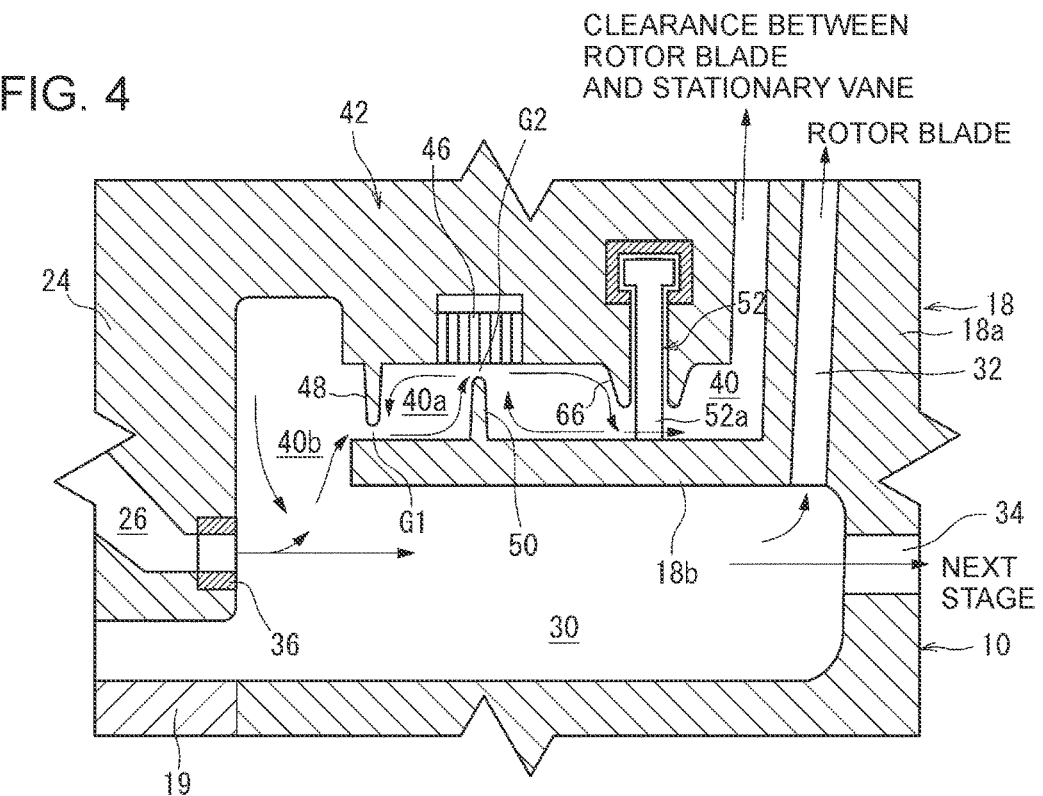
FIG. 4 is a diagram of a turbine according to some embodiments, corresponding to FIG. 3.
Figure 5:
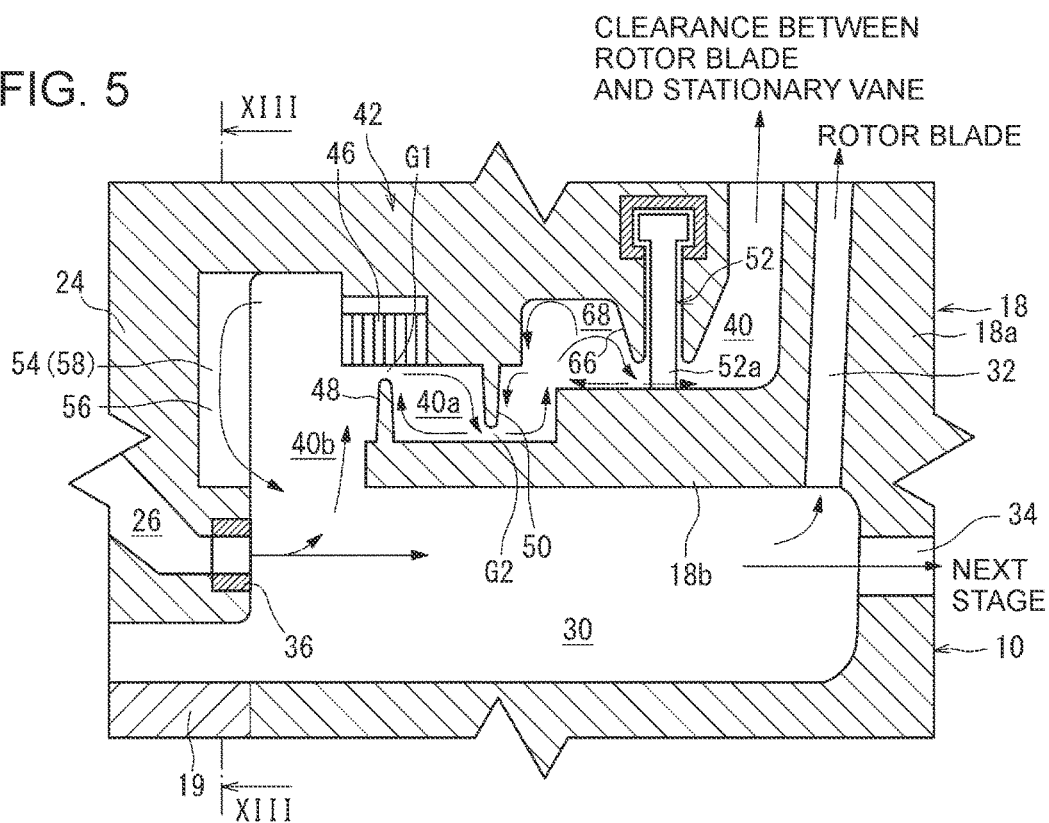
FIG. 5 is a diagram of a turbine according to some embodiments, corresponding to FIG. 3.

With the above configuration, the second non-contact type seal 50 protrudes from the inner partition-wall portion 24 being a stationary member, so that a part of the flow circulates between the first non-contact type seal 48 and the second non-contact type seal 50. Specifically, as shown in FIGS. 3, 5 to 12 and 22, when the second non-contact type seal 50 is disposed downstream of the first non-contact type seal 48, a part of air flow collides with the second non-contact type seal 50, and flows toward the first non-contact type seal 48. Furthermore, as shown in FIG. 4, when the second non-contact type seal 50 is disposed upstream of the first non-contact type seal 48, a part of air flow collides with the first non-contact type seal 48, and flows toward the second non-contact type seal 50.

Accordingly, a part of a flow of air being a fluid circulates to form a swirl, and thereby the flow of fluid makes contact with the inner partition-wall portion 24 being a stationary member over a longer distance, and the friction with the stationary member reduces the swirl component of the flow of fluid. As a result, the swirl component of the flow of fluid colliding with the contact type seal 52 or passing through the contact type seal 52 is reduced, and the reliability of the contact type seal 52 improves.

In some embodiments, as shown in FIGS. 3 to 12 and 22, the rim clearance 40 includes axial-directional clearance 40a extending along the axial direction. The first non-contact type seal 48 and the second non-contact type seal 50 are disposed in the axial-directional clearance 40a, and the position of the first gap G1 is different from the position of the second gap G2 in the radial direction.

In the above configuration, the radial-directional position of the first gap G1 is different from that of the second gap G2, and thus the flow of fluid cannot pass through the first gap G1 and the second gap G2 straight in the axial direction. Thus, between the first non-contact type seal 48 and the second non-contact type seal 50, a greater amount of fluid can be circulated to form a swirl, and it is possible to reduce the swirl component of the flow of fluid even further.

In some embodiments, as shown in FIGS. 3 to 12, 21, and 22, the rotor disc 18 includes a disc body 18a having a disc shape, and a cylindrical portion 18b extending in the axial direction from the disc body 18a. The outer peripheral surface of the cylindrical portion 18b faces the inner peripheral surface of the inner partition-wall portion 24, and the axial-directional clearance 40a is formed between the cylindrical portion 18b and the inner partition-wall portion 24.

In some embodiments, as shown in FIGS. 3 to 12 and 22, the pressure loss element 46 is a honeycomb seal, and each of the first non-contact type seal 48 and the second non-contact type seal 50 is a fin seal. The contact type seal 52 is a contact type seal called a leaf seal (trademark) (leaf type seal), and has a plurality of thin plates 52a arranged in the circumferential direction.

In the above configuration, the honeycomb seal serving as the pressure loss element 46 reduces the swirl component in the flow of fluid efficiently, and in addition, the fin seal circulates the flow of fluid to form a swirl, thereby further reducing the swirl component.

In the case of a leaf type seal, during operation of the turbine 4, the thin plates 52a separate from the rotational member due to a dynamic-pressure effect, and creates minute clearance between the thin plates 52a and the rotational member. When the turbine 4 is stopped, however, the thin plates 52a are in contact with the rotational member. Thus, the leaf type seal is regarded herein as a kind of contact type seal.

In some embodiments, the fin seal serving as the first non-contact type seal 48 is formed integrally with the rotor disc 18 serving as the rotational member, extending in the circumferential direction and having an annular plate shape. Furthermore, the fin seal serving as the second non-contact type seal 50 is formed integrally with the inner partition-wall portion 24 serving as the stationary member, extending in the circumferential direction and having an annular plate shape.

In some embodiments, the contact type seal 52 is a brush seal.

In some embodiments, the pressure loss element 46 includes a plurality of plates arranged in the circumferential direction, each intersecting with the circumferential direction.

In some embodiments, the distance d1 (see FIG. 3) between the first non-contact type seal 48 and the second non-contact type seal 50 is not less than 5 mm and not more than 15 mm. With the distance d1 being not less than 5 mm and not more than 15 mm, it is possible to reliably prevent contact between the first non-contact type seal 48 and the second non-contact type seal 50 due to thermal expansion in the axial direction, between the downstream side of the compressor (compressing part) 2 and the upstream side of the turbine (turbine part) 4 where the pressure is particularly high.

In some embodiments, the distance d1 (see FIG. 3) between the first non-contact type seal 48 and the second non-contact type seal 50 is not less than 1 mm and not more than 25 mm. With the distance d1 being not less than 1 mm and not more than 25 mm, it is possible to reliably prevent contact between the first non-contact type seal 48 and the second non-contact type seal 50 due to thermal expansion in the axial direction, in a wide range between the downstream side of the compressor (compressing part) 2 and the upstream side of the turbine (turbine part) 4.

In some embodiments, the distance d2 (see FIG. 3) between the contact type seal 52 and one of the first non-contact type seal 48 and the second non-contact type seal 50 closer to the contact type seal 52 is in a range equivalent to d1, or greater than d1.

Furthermore, the aspect ratio a1/d1 or aspect ratio a2/d2 of the space on both sides of the second non-contact type seal 50 is 0.5 to 2 (see FIG. 3). Herein, a1, a2 are the height, in the radial direction, of the space on either side of the second non-contact type seal 50.

In some embodiments, as shown in FIGS. 5 to 11, the rim clearance 40 includes a cavity 40b extending in the radial direction and positioned upstream of the axial-directional clearance 40 in the flow direction of fluid. The seal device 42 further includes a plurality of walls 54 disposed inside the cavity 40b in a state of being arranged in the circumferential direction. The plurality of walls 54 extend so as to intersect with the circumferential direction of the rotational shaft CL.

In the above configuration, the flow of fluid creates a circulating flow to form a vortex inside the cavity 40b. The fluid collides with the plurality of walls 54 disposed in the cavity 40b, and thereby the swirl component contained in the flow of fluid decreases. Accordingly, the swirl component of the flow of fluid colliding with the contact type seal 52 or passing through the contact type seal 52 is reduced, and the reliability of the contact type seal 52 improves even further.

In some embodiments, the distance between the stationary member and the rotational member at the cavity 40b is greater than the distance between the stationary member and the rotational member at the axial-directional clearance 40a.

In some embodiments, as shown in FIGS. 5 to 11, the plurality of walls 54 are formed by the wall surfaces of the plurality of grooves 56 formed on the wall of the inner partition-wall portion 24 being the stationary member defining the cavity 40b.

With the above configuration, the wall surfaces of the plurality of grooves 56 formed on the wall of the stationary member reduce the swirl component contained in the flow of fluid.

Figure 13:
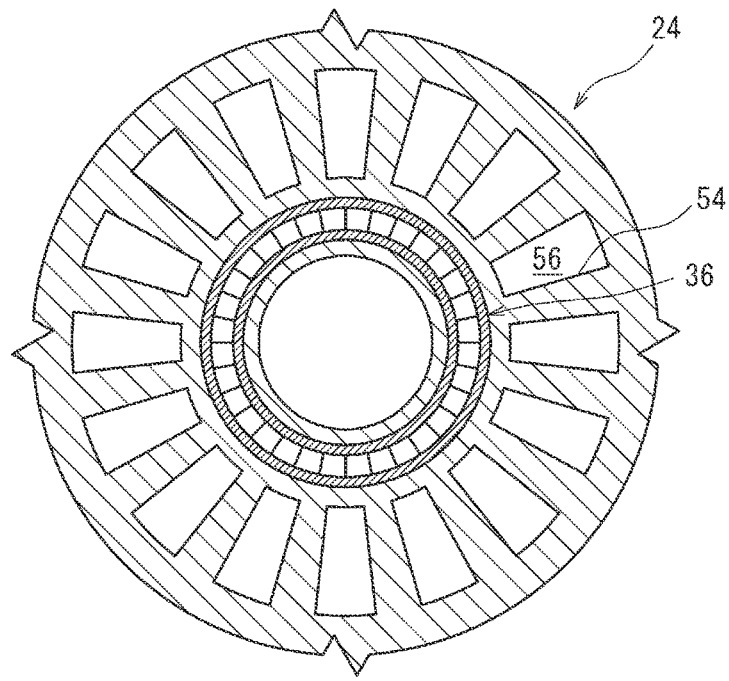
FIG. 13 is a schematic cross-sectional view of a part of an inner partition-wall portion taken along line XIII-XIII in FIGS. 5 to 7, 10, and 11, schematically shown with a swirl-component imparting device.
Figure 14:
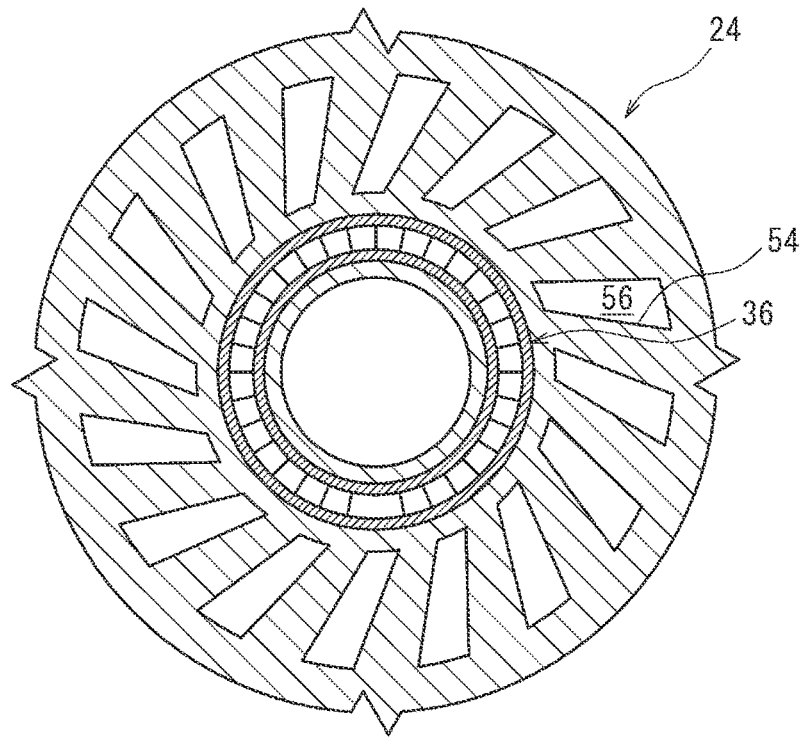
FIG. 14 is a diagram of a turbine according to some embodiments, corresponding to FIG. 13.
Figure 15:
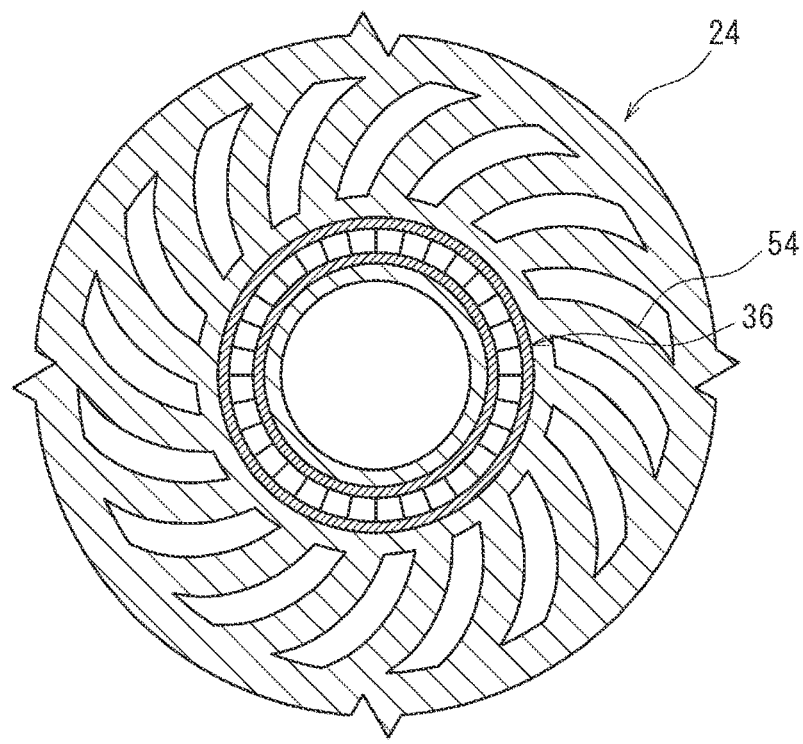
FIG. 15 is a diagram of a turbine according to some embodiments, corresponding to FIG. 13.

FIG. 13 is a schematic cross-sectional view of a part of the inner partition-wall portion 24 along line XIII-XIII in FIGS. 5 to 7, 10, and 11, schematically shown with the swirl-component imparting device 36. FIGS. 14 and 15 are a cross-sectional view corresponding to FIG. 13, according to some embodiments.

In some embodiments, as shown in FIGS. 5 to 7, 10, and 11, the wall of the stationary member defining the cavity 40b extends in the radial direction, and each of the plurality of grooves 56 extends so as to be parallel, oblique, or curved to gradually deviate with respect to the radial direction, as shown in each of FIGS. 13, 14, and 15.

With the above configuration, the plurality of grooves 56 extending so as to be parallel, oblique, or curved to gradually deviate with respect to the radial direction reduce the swirl component contained in the flow of fluid. Furthermore, as shown in FIGS. 14 and 15, the plurality of grooves 56 that are inclined or curved can reduce the swirl component by generating an inverse swirl component in the flow of fluid.

In some embodiments, the plurality of grooves 56 are formed on the end wall of the inner partition-wall portion 24 facing the axial-directional clearance 40a in the axial direction.

Figure 16:
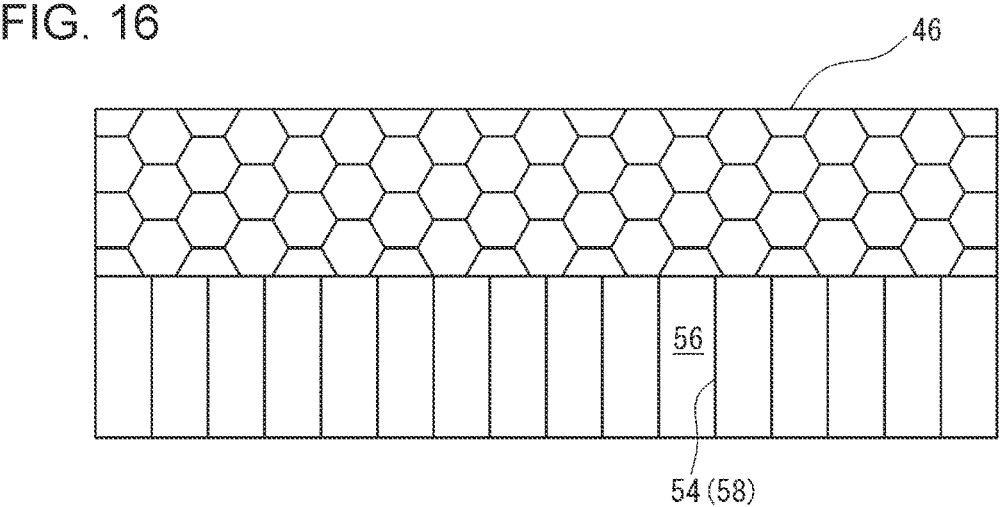
FIG. 16 is a schematic diagram of a wall of an inner partition-wall portion defining a cavity, the wall facing inward in the radial direction, shown in an exploded view with a honeycomb seal serving as a pressure loss element.
Figure 17:
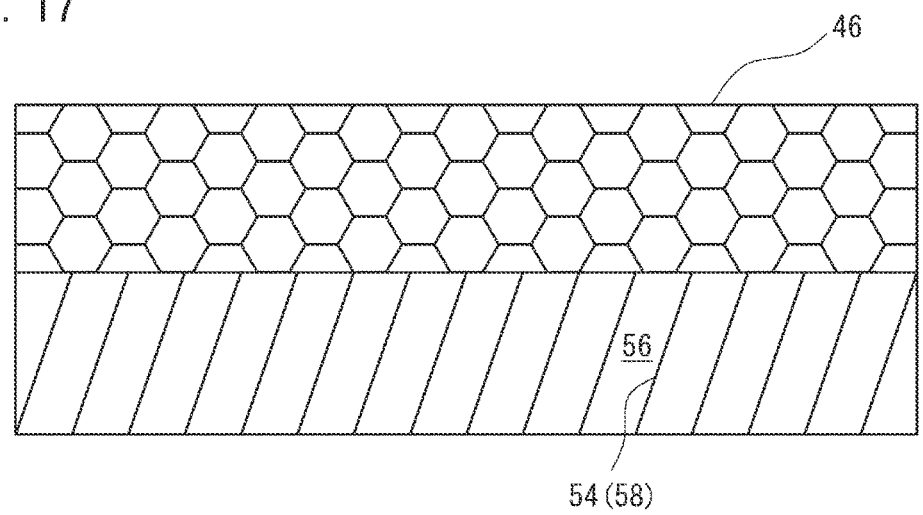
FIG. 17 is a diagram of a turbine according to some embodiments, corresponding to FIG. 16.
Figure 18:
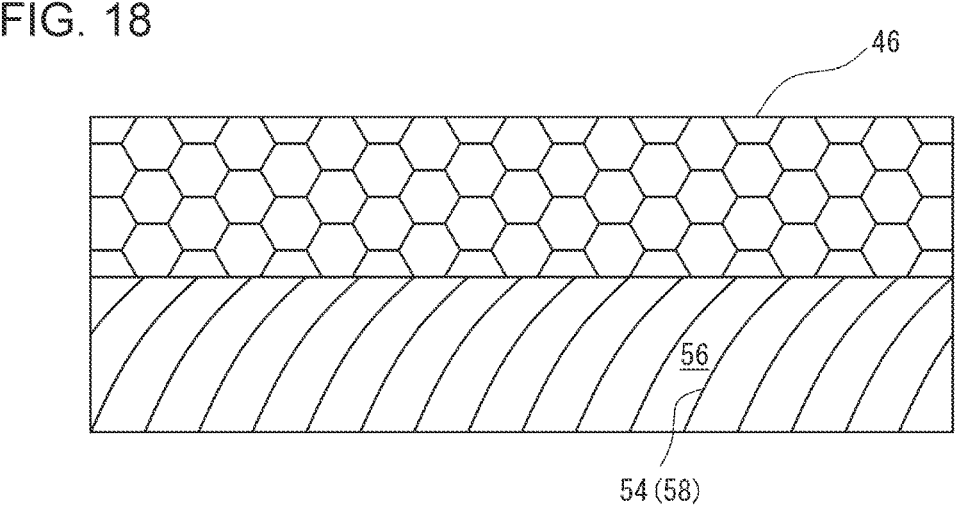
FIG. 18 is a diagram of a turbine according to some embodiments, corresponding to FIG. 16.

FIG. 16 is a schematic diagram of a wall of the inner partition-wall portion 24 defining the cavity 40b, the wall facing inward in the radial direction, shown in an exploded view with a honeycomb seal serving as the pressure loss element 46. FIGS. 17 and 18 are each a diagram of a turbine according to some embodiments, corresponding to FIG. 16.

In some embodiments, as shown in FIGS. 8 and 9, the wall of the stationary member on which the plurality of grooves 56 are formed extends in the axial direction, and each of the plurality of grooves 56 extends so as to be parallel, oblique, or curved to gradually deviate with respect to the axial direction, as shown in each of FIGS. 16, 17, and 18.

With the above configuration, the plurality of grooves 56 extending so as to be parallel, oblique, or curved to gradually deviate with respect to the axial direction reduce the swirl component contained in the flow of fluid. Furthermore, as shown in FIGS. 17 and 18, the plurality of grooves 56 that are inclined or curved can reduce the swirl component by generating an inverse swirl component in the flow of fluid.

In some embodiments, as shown in FIGS. 5 to 11, the plurality of walls 54 are formed by the wall surfaces of the plurality of baffles 58 disposed inside the cavity 40b.

With the above configuration, the plurality of baffles 58 disposed inside the cavity 40b reduce the swirl component contained in the flow of fluid.

In some embodiments, similarly to the case of the above described plurality of grooves 56, each of the plurality of baffles 58 extends so as to be parallel, oblique, or curved to gradually deviate with respect to the radial direction.

With the above configuration, the plurality of baffles 58 extending so as to be parallel, oblique, or curved to gradually deviate with respect to the radial direction reduce the swirl component contained in the flow of fluid. Furthermore, the plurality of baffles 58 that are inclined or curved can reduce the swirl component by generating an inverse swirl component.

In some embodiments, similarly to the case of the above described plurality of grooves 56, each of the plurality of baffles 58 extends so as to be parallel, oblique, or curved to gradually deviate with respect to the axial direction.

With the above configuration, the plurality of baffles 58 extending so as to be parallel, oblique, or curved to gradually deviate with respect to the radial direction reduce the swirl component contained in the flow of fluid. Furthermore, the plurality of baffles 58 that are inclined or curved can reduce the swirl component by generating an inverse swirl component.

In some embodiments, the cavity 40b has an opening that opens into the second space 30. The second space 30 is a flow passage (main flow passage) extending in the axial direction, through which a fluid having a swirl component imparted by the swirl-component imparting device 36 can flow. As shown in FIGS. 6, 7, 9, and 10, the inner partition-wall portion 24 being a stationary member or the rotor disc 18 being a rotational member has a wall extending in the radial direction and a protruding portion 60 extending from the wall in the axial direction and defining the width of the opening of the cavity 40b, so that the width of the opening of the cavity 40b is smaller than the width of the cavity 40b.

In the above configuration, it is possible to adjust the width of the opening of the cavity 40b with the protruding portion 60, and to adjust the flow rate of the fluid flowing from the second space 30 to the cavity 40b. Accordingly, it is possible to adjust the mixing state of the flow of the fluid flowing from the second space 30 into the cavity 40b and the circulation flow inside the cavity 40b. Further, by adjusting the mixing state, it is possible to reduce the swirl component contained in the flow of the fluid.

In some embodiments, as shown in FIG. 11, the surface on the side of the cavity 40b of the protruding portion 60 includes an inclined surface 60a inclined with respect to the axial direction.

With the inclined surface 60a, it is possible to adjust the mixing state of the circulation flow inside the cavity 40b and the flow of the fluid flowing into the opening from the second space 30, and thus it is possible to reduce the swirl component contained in the flow of the fluid.

Figure 19:
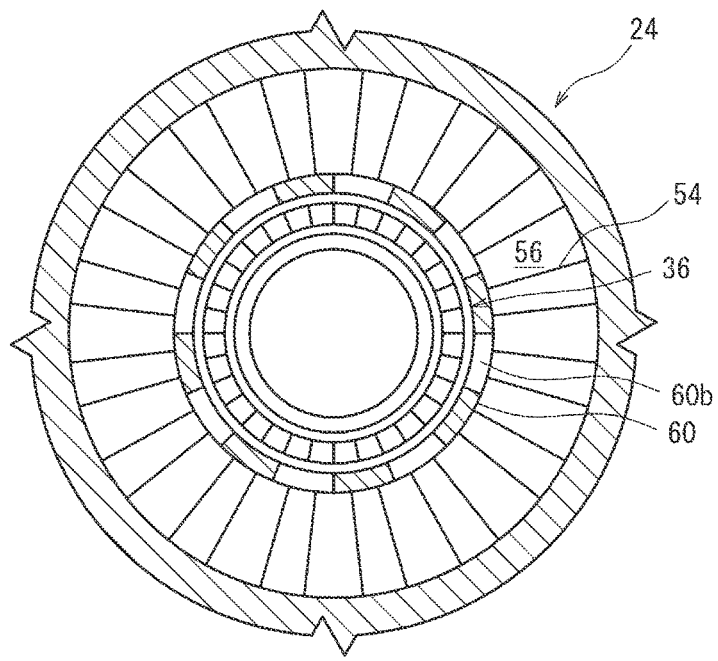
FIG. 19 is a schematic cross-sectional view of a part of an inner partition-wall portion and a cylindrical portion taken along line XIX-XIX in FIG. 10.

FIG. 19 is a schematic cross-sectional view of a part of the inner partition-wall portion 24 taken along line XIX-XIX of FIG. 10. In some embodiments, as shown in FIGS. 10 and 11, a plurality of recessed portions 60b are formed on the tip side of the protruding portion 60 so as to be arranged in the circumferential direction of the rotational shaft, and the plurality of recessed portions 60b change the width of the opening in the circumferential direction.

In the above configuration, it is possible to adjust the flow rate of the fluid flowing from the second space 30 to the cavity 40b by changing the width of the opening with the plurality of recessed portions 60b of the protruding portion 60. Accordingly, it is possible to adjust the mixing state of the circulation flow inside the cavity 40b and the flow of the fluid flowing into the opening from the second space 30, and thus it is possible to reduce the swirl component contained in the flow of the fluid.

Figure 12:
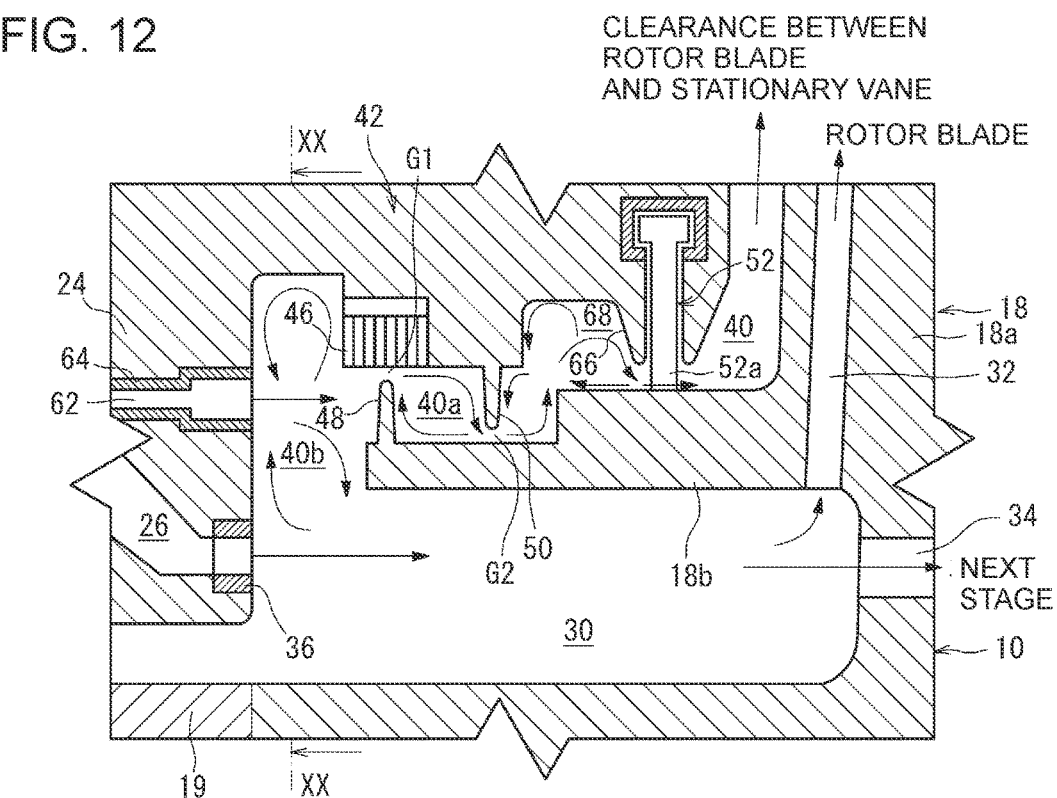
FIG. 12 is a diagram of a turbine according to some embodiments, corresponding to FIG. 3.
Figure 20:
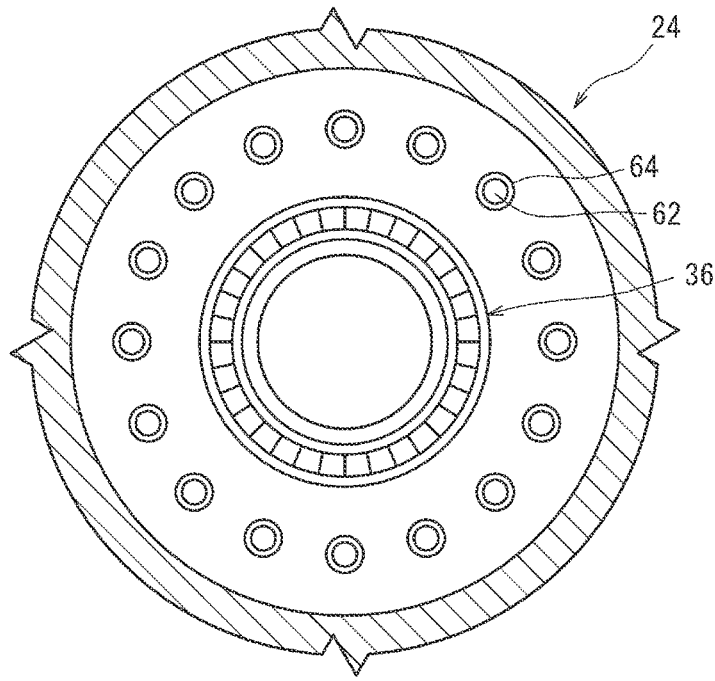
FIG. 20 is a schematic cross-sectional view of a part of an inner partition-wall portion taken along line XX-XX in FIG. 12.

FIG. 20 is a schematic cross-sectional view of a part of the inner partition-wall portion 24 taken along line XX-XX of FIG. 12. As shown in FIGS. 12 and 20, in some embodiments, at least one swirl-component suppressing flow passage 62 is disposed on the inner partition-wall portion 24 being a stationary member. The swirl-component suppressing flow passage 62 is configured to be capable of supplying a fluid for reducing the swirl component of the fluid (swirl-component suppressing fluid) to upstream of the pressure loss element 46 in the rim clearance 40, for instance, to the cavity 40b.

With the above configuration, the fluid supplied to the cavity 40b through the swirl-component suppressing flow passage 62 prevents the fluid from flowing into the cavity 40b from the second space 30, or is mixed with the fluid flowing into the cavity 40b from the second space 30, and thereby it is possible to reduce the swirl component contained in the flow of the fluid flowing into the axial-directional clearance 40a.

In some embodiments, the swirl-component suppressing flow passage 62 includes a plurality of jumper tubes 64 mounted to the inner partition-wall portion 24 being a stationary member. The plurality of jumper tubes 64 are disposed at distance from one another in the circumferential direction, and the outlet of each jumper tube 64 faces the axial-directional clearance 40a in the axial direction.

In some embodiments, the swirl-component suppressing flow passage 62 is configured to supply the cavity 40b with a fluid having an inverse swirl component directed opposite from the swirl component of the fluid flowing into the cavity 40b from the second space 30. For this, for instance, the outlet side of the swirl-component suppressing flow passage 62, for instance the outlet side of each of the plurality of jumper tubes 64, is disposed so as to be oblique or covered to gradually deviate with respect to the axial direction.

In some embodiments, the swirl-component suppressing flow passage 62 extends between the first space 28 and the cavity 40b.

Figure 21:
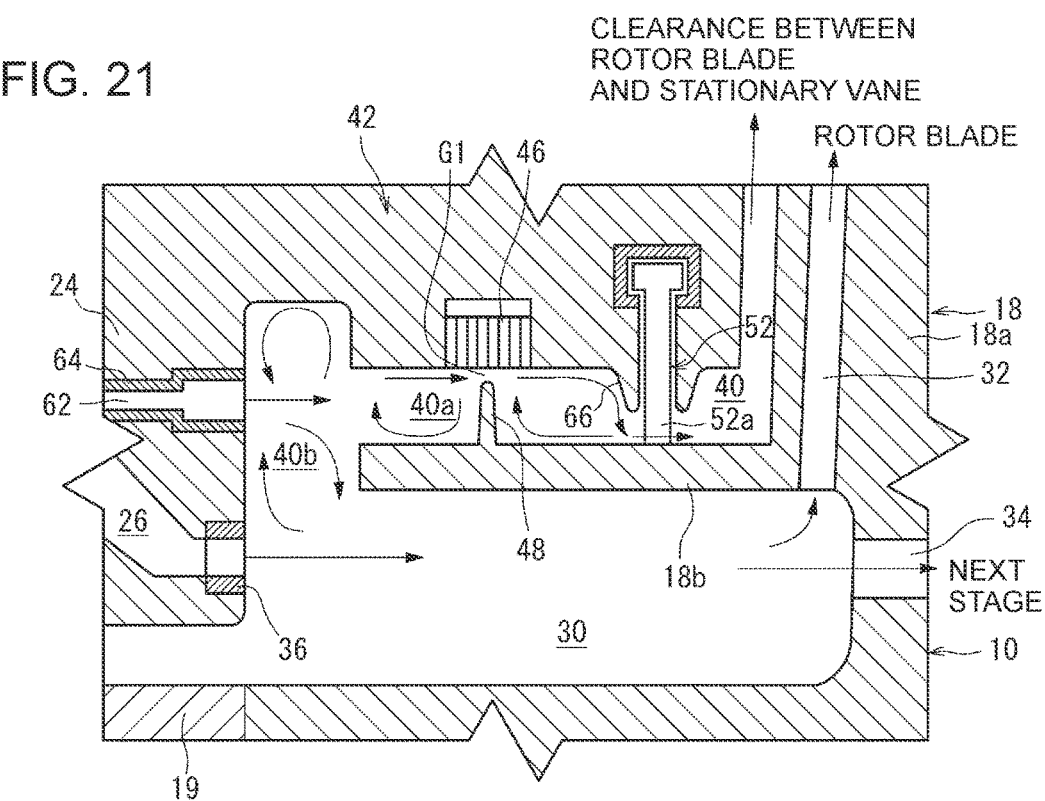
FIG. 21 is a diagram of a turbine according to some embodiments, corresponding to FIG. 3.

In some embodiments, if the swirl-component suppressing flow passage 62 is provided, the seal device 42 may not necessarily include the second non-contact type seal 50, as shown in FIG. 21.

In some embodiments, as shown in FIGS. 3, 5 to 12, and 22, a step is provided between the second non-contact type seal 50 and the contact type seal 52, on the outer peripheral surface of the cylindrical portion 18b of the rotor disc 18. Specifically, a step is disposed on the wall surface of the rotational member defining the axial-directional clearance 40a. Further, the radial-directional position of a section of the cylindrical portion 18b that makes contact with the contact type seal 52 is different from the radial-directional position of the second gap G2.

With the above configuration, a step is formed on the wall surface of the rotational member, between the second non-contact type seal 50 and the contact type seal 52, and the radial-directional position of a section of the rotational member that makes contact with the contact type seal 52 is different from the radial-directional position of the second gap G2, and thereby it is possible to create swirls between the second non-contact type seal 50 and the contact type seal 52. Accordingly, the flow of fluid makes contact with the inner partition-wall portion 24 being a stationary member over a longer distance, and the friction with the stationary member reduces the swirl component of the flow of fluid. As a result, the swirl component of the flow of fluid colliding with the contact type seal 52 or passing through the contact type seal 52 decreases, and the reliability of the contact type seal 52 improves.

In some embodiments, as shown in FIGS. 3, 5 to 12, 21, and 22, a bank 66 protruding toward the cylindrical portion 18b of the rotor disc 18 being a rotational member from the inner partition-wall portion 24 being a stationary member is formed on the upstream side of the contact type seal 52 in the flow direction of the fluid. The bank 66 is disposed next to the contact type seal 52. The upstream surface of the bank 66 is inclined from the radial direction so that the flow path area gradually reduces at the upstream side of the contact type seal 52.

With the above configuration, the flow of fluid makes contact with the bank 66, and the friction reduces the swirl component of the flow of fluid. As a result, the swirl component of the flow of fluid colliding with the contact type seal 52 or passing through the contact type seal 52 is reduced, and the reliability of the contact type seal 52 improves.

In some embodiments, as shown in FIGS. 3, 5 to 12, and 22, a recessed portion 68 of an annular shape is formed on the inner partition-wall portion 24, disposed between the second non-contact type seal 50 and the contact type seal 52. The recessed portion 68 has an opening toward the axial-directional clearance 40a, and increases the flow path area of the axial-directional clearance 40a in the radial direction of the rotational member as compared to the second gap G2.

In some embodiments, as shown in FIGS. 3, 5 to 12 and 22, the downstream wall surface of the recessed portion 68 in the flow direction of the fluid includes the bank 66.

Figure 22:
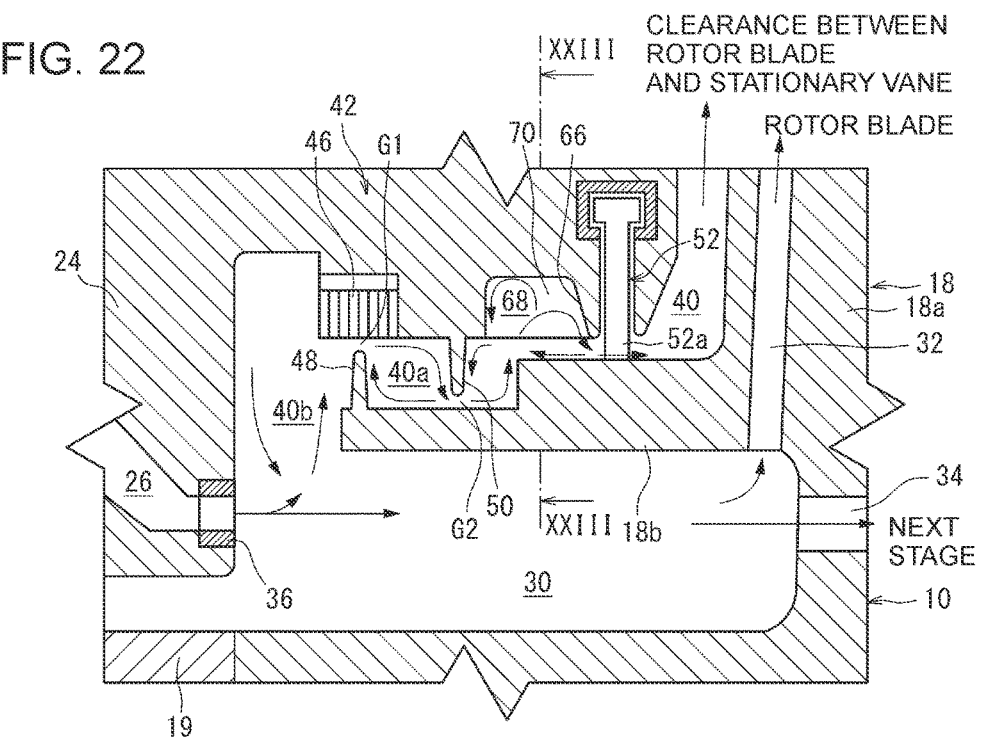
FIG. 22 is a diagram of a turbine according to some embodiments, corresponding to FIG. 3.
Figure 23:
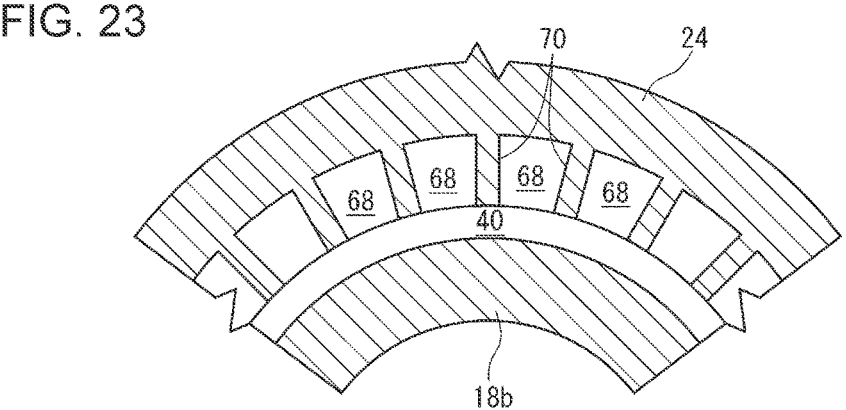
FIG. 23 is a schematic cross-sectional view of a part of an inner partition-wall portion taken along line XXIII-XXIII of FIG. 22.

In some embodiments, as shown in FIGS. 22 and 33, a plurality of partition walls 70 defining the recessed portion 68 in the circumferential direction is disposed inside the recessed portion 68. The partition wall 70 is formed integrally with the inner partition-wall portion 24.

With the above configuration, the recessed portion 68 is disposed upstream of the contact type seal 52, and the partition wall 70 is disposed inside the recessed portion 68, which makes it possible to increase the contact area in which the flow of the fluid containing the swirl component makes contact with the wall surface of the recessed portion 68. Further, with an increase of resistance due to an increase in the contact area on the wall surface of the recessed portion 68, it is possible to attenuate the swirl component of the fluid even further.

Embodiments of the present invention were described in detail above, but the present invention is not limited thereto, and various amendments and modifications may be implemented.

For instance, in the above embodiment, the inner partition-wall portion 24 being a stationary member may include a plurality of members. Further, the rotor disc 18 being a rotational member may include a plurality of members.

Further, the clearance to which the seal device 42 is applied is not limited to the rim clearance 40, and may be another clearance between the stationary member and the rotational member included in the turbine 4.

Moreover, the rotary machine to which the seal device 42 is applied is not limited to a gas turbine, and may be a steam turbine, a compressor, or a generator, for instance.

DESCRIPTION OF REFERENCE NUMERALS

1 Gas turbine
2 Compressor
3 Combustor
4 Turbine
6 Generator
8 Casing
8a Inner casing
8b Outer casing
10 Rotor
12 Stationary vane
12a Vane portion
12b Platform
12c Platform
14 Rotor blade
14a Blade portion
14b Platform
14c Blade root portion
16 Ring segment
18 Rotor disc
18a Disc body
18b Cylindrical portion
19 Shaft
20 Outer partition-wall portion
22 Combustion gas flow passage
24 Inner partition-wall portion
26 Compressed-air supply passage
28 First space
30 Second space
32 Radial-directional hole
34 Axial-directional hole
36 Swirl-component imparting device
40 Rim clearance
40a Axial-directional clearance
40b Cavity
42 Seal device
46 Pressure loss element
48 First non-contact type seal
50 Second non-contact type seal
52 Contact type seal
52a Thin plate
56 Wall
54 Groove
56 Baffle
58 Protruding portion
60a Inclined surface
60b Recessed portion
62 Swirl-component suppressing flow passage
64 Jumper tube
66 Bank
68 Recessed portion
70 Partition wall
G1 First gap
G2 Second gap

The invention claimed is:

1. A rotary machine, comprising:
at least one stationary member;
at least one rotational member configured to be relatively rotatable with respect to the at least one stationary member;
a seal device capable of restricting a flow of a fluid in a clearance between the at least one stationary member and the at least one rotational member; and
a swirl-component imparting device capable of imparting a swirl component to the fluid, wherein the seal device comprises:
a honeycomb seal mounted to the at least one stationary member;
a first non-contact type seal protruding from the at least one rotational member toward the honeycomb seal and facing a lower surface of the honeycomb seal via a first gap;
a second non-contact type seal protruding from the at least one stationary member toward the at least one rotational member, facing the at least one rotational member via a second gap, and being positioned on one side of the honeycomb seal in a flow direction of the fluid; and
a contact type seal protruding from the at least one stationary member toward the at least one rotational member and being disposed downstream of the honeycomb seal and the second non-contact type seal in the flow direction of the fluid,
wherein the clearance between the at least one rotational member and the at least one stationary member includes an axial-directional clearance extending along a rotational shaft of the rotational member and a cavity extending in a radial direction of the rotational shaft of the rotational member and being disposed upstream of the axial-directional clearance in the flow direction of the fluid,
wherein the cavity has an opening which opens into a main flow passage extending in an axial direction of the rotational shaft and being capable of letting the fluid having the swirl component imparted by the swirl-component imparting device flow through,
wherein one of the at least one stationary member or the at least one rotational member includes a first wall extending in the radial direction of the rotational shaft and a protruding portion extending in the axial direction of the rotational shaft from the first wall and defining a width of the opening, so that the width of the opening is smaller than a width of the cavity, and
wherein a step is provided between the second non-contact type seal and the contact type seal on an outer peripheral surface of the at least one rotational member.

2. The rotary machine according to claim 1,
wherein the first non-contact type seal and the second non-contact type seal are disposed in the axial-directional clearance, and
wherein, in the radial direction of the rotational shaft, a position of the first gap is different from a position of the second gap.

3. The rotary machine according to claim 2,
wherein the seal device further comprises a plurality of second walls disposed inside the cavity so as to be arranged in a circumferential direction of the rotational shaft, each of the plurality of second walls intersecting with the circumferential direction of the rotational shaft.

4. The rotary machine according to claim 3,
wherein the plurality of second walls comprise wall surfaces of a plurality of grooves formed on a wall portion of the at least one stationary member defining the cavity.

5. The rotary machine according to claim 4,
wherein the wall portion of the at least one stationary member defining the cavity extends in the radial direction of the rotational shaft, and
wherein each of the plurality of grooves extends so as to be parallel, oblique, or curved to gradually deviate with respect to the radial direction of the rotational shaft.

6. The rotary machine according to claim 4, wherein the wall portion of the at least one stationary member defining the cavity extends in the axial direction of the rotational shaft, and
wherein each of the plurality of grooves extends so as to be parallel, oblique, or curved to gradually deviate with respect to the axial direction of the rotational shaft.

7. The rotary machine according to claim 3,
wherein the plurality of second walls comprise wall surfaces of a plurality of baffles disposed inside the cavity.

8. The rotary machine according to claim 7,
wherein each of the plurality of baffles extends so as to be parallel, oblique, or curved to gradually deviate with respect to the radial direction of the rotational shaft.

9. The rotary machine according to claim 7,
wherein each of the plurality of baffles extends so as to be parallel, oblique, or curved to gradually deviate with respect to the axial direction of the rotational shaft.

10. The rotary machine according to claim 1,
wherein a surface of the protruding portion closer to the cavity is inclined with respect to the axial direction of the rotational shaft.

11. The rotary machine according to claim 1,
wherein a plurality of recessed portions arranged in a circumferential direction of the rotational shaft are formed on a tip side of the protruding portion, and the plurality of recessed portions change the width of the opening in the circumferential direction of the rotational shaft.

12. A rotary machine, comprising:
at least one stationary member;
at least one rotational member configured to be relatively rotatable with respect to the at least one stationary member; and
a seal device capable of restricting a flow of a fluid in a clearance between the at least one stationary member and the at least one rotational member,
wherein the seal device comprises:
 a pressure loss element mounted to the at least one stationary member;
 a first non-contact type seal protruding from the at least one rotational member toward the pressure loss element and facing the pressure loss element via a first gap;
 a second non-contact type seal protruding from the at least one stationary member toward the at least one rotational member, facing the at least one rotational member via a second gap, and being positioned on one side of the pressure loss element in a flow direction of the fluid;
 a contact type seal protruding from the at least one stationary member toward the at least one rotational member and being disposed downstream of the pressure loss element and the second non-contact type seal in the flow direction of the fluid; and
 at least one swirl-component suppressing flow passage disposed in the at least one stationary member, the at least one swirl-component suppressing flow passage being capable of supplying a fluid for reducing a swirl component of the fluid to a section upstream of the pressure loss element in the flow direction of the fluid in the clearance between the at least one stationary member and the at least one rotational member.

13. The rotary machine according to claim 1,
wherein each of the first non-contact type seal and the second non-contact type seal is a fin seal, and
wherein the contact type seal has a plurality of thin plates arranged in a circumferential direction of a rotational shaft of the rotational member.

14. A rotary machine, comprising:
at least one stationary member;
at least one rotational member configured to be relatively rotatable with respect to the at least one stationary member;
a seal device capable of restricting a flow of a fluid in a clearance between the at least one stationary member and the at least one rotational member; and
a swirl-component imparting device disposed upstream of the seal device in a flow direction of the fluid and being capable of imparting a swirl component to the fluid,
wherein the clearance between the at least one stationary member and the at least one rotational member includes a cavity having an opening into a main flow passage being capable of letting the fluid having the swirl component imparted by the swirl-component imparting device flow through, and
wherein the seal device comprises:
 a pressure loss element mounted to the at least one stationary member and being disposed downstream of the cavity in the flow direction of the fluid;
 a first non-contact type seal protruding from the at least one rotational member toward the pressure loss element and facing the pressure loss element via a first gap;
 a contact type seal protruding from the at least one stationary member toward the at least one rotational member and being disposed downstream of the pressure loss element and the first non-contact type seal in the flow direction of the fluid; and
 at least one swirl-component suppressing flow passage disposed in the at least one stationary member and being capable of supplying the cavity with a fluid for reducing the swirl component of the fluid.

* * * * *